United States Patent

Hirosawa et al.

Patent Number: 5,123,059
Date of Patent: Jun. 16, 1992

[54] GRADATION CONVERTING CIRCUIT EMPLOYING LOOKUP TABLE

[75] Inventors: Makoto Hirosawa; Masami Aragaki, both of Kyoto, Japan

[73] Assignee: Dainippon Screen Mfg. Co., Ltd., Japan

[21] Appl. No.: 249,984

[22] Filed: Sep. 27, 1988

[30] Foreign Application Priority Data

Sep. 28, 1987 [JP] Japan ............................. 62-245680
Nov. 7, 1987 [JP] Japan ............................. 62-281800

[51] Int. Cl.$^5$ ............................................... G06K 9/00
[52] U.S. Cl. ........................................ 382/50; 341/50; 358/426; 382/52
[58] Field of Search ............... 382/50, 52, 56; 358/261.2, 426, 430, 455, 466; 341/50, 107

[56] References Cited

U.S. PATENT DOCUMENTS

| | | | |
|---|---|---|---|
| 4,498,104 | 2/1985 | Schulz | 382/52 |
| 4,853,792 | 8/1989 | Katsuta et al. | 382/52 |
| 4,972,502 | 11/1990 | Katsuta et al. | 382/52 |

FOREIGN PATENT DOCUMENTS

0163903A1 11/1985 European Pat. Off. .

Primary Examiner—Leo H. Boudreau
Attorney, Agent, or Firm—Ostrolenk, Faber, Gerb & Soffen

[57] ABSTRACT

A gradation converting circuit for converting digital input data to output data, in accordance with a predetermined input/output relationship. The input and output data is provided as data words having a predetermined number of bits "m". Since the resolution provided in the output by the "m" bits is insufficient for accurately expressing the aforementioned input/output relationship and to satisfy a demand to keep the number of bits at "m", an improved output resolution is obtained by varying the value outputted for any given input data over time such that the average of the outputs is closer to a desired output demanded by the input/output relationship. This is accomplished either by storing, for each input data, a plurality of outputs whose average is equal to the desired predetermined, input/output relationship, or, by outputting for each digital input data a so-called "decimal" value which is indicative of how often a fixed predetermined output value should be increased by one such that the average of the output should approximate the desired output value.

28 Claims, 9 Drawing Sheets

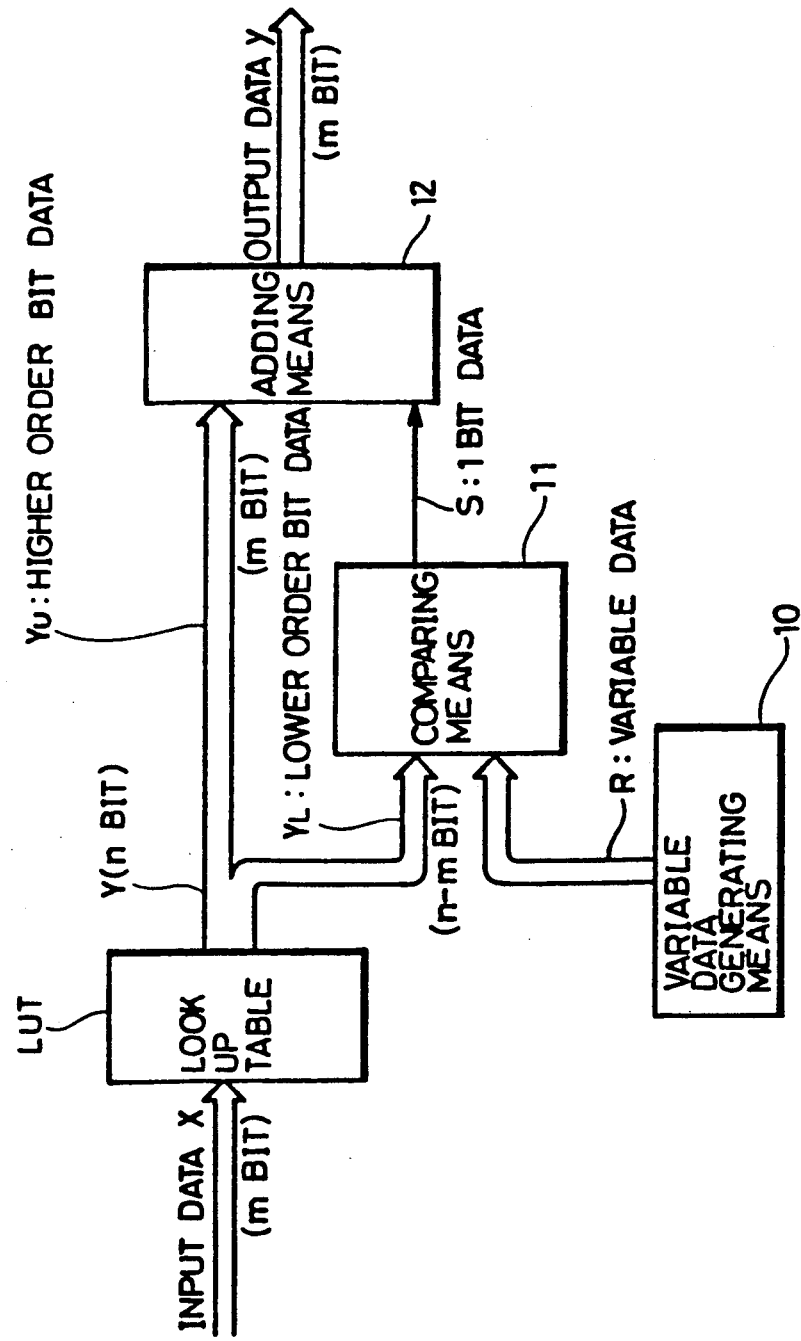

FIG. 11

| ADDRESS | | CONVERTED DATA | |
|---|---|---|---|
| SELECTING SIGNAL | INPUT DATA | | |
| $S_1$ ⋮ $S_1$ | $X_0$ $X_1$ $X_2$ ⋮ $X_j$ ⋮ $X_N$ | $I_0$ $I_1$ $I_2$ $I_j$ $I_N$ | LUT$_1$ |
| $S_2$ ⋮ $S_2$ | $X_0$ $X_1$ $X_2$ ⋮ $X_j$ ⋮ $X_N$ | $I_0$ $I_1$ $I_2$ $I_j$ $I_N$ | LUT$_2$ |
| $S_3$ ⋮ $S_3$ | $X_0$ $X_1$ $X_2$ ⋮ $X_j$ ⋮ $X_N$ | $I_0$ $I_1+1$ $I_2$ $I_j$ $I_N$ | LUT$_3$ |
| $S_j$ ⋮ $S_j$ | $X_0$ $X_1$ $X_2$ ⋮ $X_j$ ⋮ $X_N$ | $I_0$ $I_1+1$ $I_2+1$ $I_j+1$ $I_N$ | LUT$_j$ |
| $S_N$ ⋮ $S_N$ | $X_0$ $X_1$ $X_2$ ⋮ $X_j$ ⋮ $X_N$ | $I_0$ $I_1+1$ $I_2+1$ $I_j+1$ $I_N$ | LUT$_N$ |

GRADATION CONVERTING CIRCUIT EMPLOYING LOOKUP TABLE

BACKGROUND OF THE INVENTION

1. Field of the Invention

The present invention relates to a gradation converting circuit for image signal processing and, more specifically, it relates to a digital gradation converting circuit for image signal processing which reduces tone discontinuities, false contour lines, and so on.

2. Description of the Prior Art

FIG. 1 depicts the relation between density range of an original and the density range of a printed matter. Color films, which occupy most of color originals, have a density range of 2.4 to 3.5. However, the density range in printed reproductions of originals is about 1.8 to 2.0. Therefore, the density range of printed matter must be compressed with respect to the original thereof. In FIG. 1, the line A is a density curve of a case where the entire range is simply compressed. In this case, the printed matter is faint in general. Therefore, the highlight to intermediate density range including important objects should not be so much compressed as the shadow portion. The example of that case is shown by the curve B. The reproduction of an image wherein with the degree of compression is changed partially is referred to as tone correction, and a circuit for carrying out the tone correction is called a gradation converting circuit.

A gradation converting circuit (also referred to as a gradation circuit, density range correction circuit) as described above is indispensable to scanners, a common image input apparatuses or in an image processing apparatuses.

Generally, the gradation converting circuit provides an output data $y = f(x)$ using a function f having a desired conversion characteristics in association with an input data x. The gradation converting circuit comprises both analog gradation converting circuits and digital gradation converting circuits. The input data x and the output y are data related to density (or reflectance, transmittance, brightness and so on).

An analog circuit is disadvantageous in that arbitrary functional characteristics cannot be obtained, and in that the circuit becomes unstable due to resistance fluctuations caused by temperature variations. A digital circuit can supply output data from a memory to produce an arbitrary function in response to input data applied to the address lines of the memory, producing a so-called lookup table (LUT). When a LUT is used, the speed of processing of the gradation conversion is determined by the access time of the memory, allowing the speed to be increased while maintaining stability, eliminating the problems of the analog circuit. The aforesaid memory may be an RAM (random access memory) or an ROM (read only memory). In case of an RAM, the functional characteristics that is the output produced by the RAM can be easily changed, e.g. by reprogramming the contents of the RAM.

However, in a digital gradation converting circuit which employs a lookup table is susceptible of producing quantization errors. This is not a problem in an analog circuit. More specifically, in the above described and similar gradation converting circuits, the non-linear characteristics of the gradation curve is formed by means of the lookup table, so that errors in quantization are generated in the output data.

In order to briefly explain the above described problem, a simple example will be described with reference to FIG. 2 in which each of the input, and output data are respectively constituted of 4 bits. In the field of photolithography and the like requiring high precision, the lookup table is usually formed with 8 bits. The larger the number of bits, the smoother becomes the gradation curve.

Referring to FIG. 2, the input/output converting characteristic of the basic data of the outputs to the inputs x is represented by a smooth curve A. However, the actual characteristic has a 1 bit uncertainty producing the stepwise varying output denoted by the line B, as a result of the digital nature of the circuit.

For example, for $x = 6$, the curve A in FIG. 1 yield an output 9.75. However, in digital system, the actual value will be $y = 10$, the basic data being rounded off. Obtaining such a stepwise line B is disadvantageous in tone reproduction applications.

In FIG. 2, when the input data x changes from 0 to 1, the output data y rapidly changes from 0 to 3. When x changes from 1 to 2, y changes from 3 to 5. Consequently, in the displayed image and undesired phenomenon called tone jump or false contour line is generated in which the gradation changes abruptly.

In contrast to the foregoing, when x changes from 8 to 9, y remains at 12. Similarly, y is not changed when x changes from 11 to 12. At these portions of the curve, delicate differences of gradation cannot be reproduced.

In order to solve the problem, the number of bits of the data x and y should be increased to minimize errors. However, if the number of bits is increased, the circuit becomes complicated and the cost thereof is increased. Therefore, increasing the bit number is impractical.

Therefore, in order to reduce the errors in quantization, a method has been proposed in which random numbers (noise) are mixed with the data to minimize the influence of the errors in quantization as shown in FIGS. 3A and 3B.

In FIG. 3A, a random number, outputted at random from a random number generating circuit 21, is added to the input data x by an adder 22. The added data designates an address in the lookup table LUT, and an output data y is outputted in correspondence with the designated address.

In FIG. 3B, an address for the lookup table LUT is designated by an input data x and a random number data outputted at random from the random number generating circuit 21 is added to the data outputted from the lookup table LUT by the adder 22, with the result of the addition outputted as the output data y.

In the above described methods, noise numbers are directly mixed with the signals. Therefore, as the random numbers of larger bits are added to reduce the tone jump or false contour line, excessive noise is introduced, and the image quanlity suffers.

SUMMARY OF THE INVENTION

Therefore, one object of the present invention is to provide a digital gradation converting circuit by which the tone jump is reduced without increasing the number of bits of pixel signals.

Another object of the present invention is to provide a digital gradation converting circuit in which the mixing of noise exerts no influence on actual images.

A further object of the present invention is to provide a digital gradation converting circuit in which intermediate gradation portions can be formed with high precision even if the output bit number is small when the gradation is digitally-converted.

A still further object of the present invention is to provide a digital gradation converting circuit in which intermediate gradation portions can be easily formed by means of a simple circuit.

The above described objects of the present invention are attained by a gradation converting circuit outputting, in response to a digital input data representing optical-physical quantity of each pixel in an image represented by a first plurality of bits, a digital output data representing the optical-physical quantity of each corresponding pixel in the image represented by a second plurality of bits. The gradation converting circuit comprises: storing means for storing a prescribed basic data determined in analog manner in accordance with the input data; output value preparing means for preparing a plurality of output values in association with the input data; output value selecting means for selecting a single output value out of the plurality of output values prepared by the output value preparing means wherein the selected single output value corresponds to the output data; and output value adjusting means for approximating an expected value of the output value to the basic data.

Since the gradation converting circuit comprises the above described components, when there are a number of output data provided for the same input data, the gradation of the collection of these output data will be intermediate gradation when viewed macroscopically, which cannot be represented by a prescribed number of bits. Consequently, a digital gradation converting circuit can be provided in which tone jumps can be reduced without increasing the number of bits of pixel signals.

According to a preferred embodiment of the present invention, the output value preparing means comprises a LUT for outputting the output value in correspondence with the input data; the basic data is represented by a sum of a prescribed integer value and a prescribed decimal value; the output value of the LUT is represented by a third plurality of bits larger than the first plurality of bits; the output value represented by the third plurality of bits is brought near to the basic data, and it comprises the first prescribed integer value represented by the first plurality of bits, and a decimal value represented by a fourth plurality of bits which is represented by a difference between the first plurality of bits and the third plurality of bits.

Since the gradation converting circuit comprises the above described components, a value approximate to the expected value is provided by an arbitrary plurality of bits. Therefore, a gradation converting circuit can be provided in which portions of a highly precise intermediate gradation can be formed even if a prescribed number of output bits is small, by appropriately selecting the bit number.

According to another preferred embodiment of the present invention, the output value adjusting means comprises variable data generating means for generating a variable data represented by the fourth plurality of bits, and comparing means for comparing the variable data with a decimal value represented by the fourth plurality of bits to output the result of comparison; and the output value selecting means comprises adding means responsive to the result of comparison for adding the prescribed second integer value to the prescribed first integer value.

Since the gradation converting circuit employing an LUT comprises the above described components, a random number generating circuit or the like is not used for forming the portion of intermediate gradation. Therefore, a digital gradation converting circuit can be provided in which merger of noise is not a problem.

According to a more preferred embodiment of the present invention, a plurality of LUTs are provided; the output value in respective LUTs comprises a first value and a second value represented by the second plurality of bits; the output value preparing means comprises a plurality of LUTs; and the output value adjusting means comprises basic data approximation means for bringing, when one LUT is selected from the plurality of LUTs, the expected value of the output values outputted from the selected LUT near to the basic data.

Since the gradation converting circuit comprises the above described components, a gradation converting circuit can be provided in which portions of intermediate gradation can be easily formed without preparing a complicated circuit.

According to a more preferred embodiment of the present invention, the output value selecting means comprises random number generating means for generating random numbers, and the output value selecting means selects a single LUT out of the plurality of LUTs based on the random number.

Since the gradation converting circuit comprises the above described component, output data can be obtained at random. Therefore, a gradation converting circuit can be provided in which appropriate intermediate gradation portions can be formed.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram of a gradation converting circuit employing an LUT in accordance with a first embodiment of the present invention;

FIG. 11 is an example of an input/output converting characteristic model in accordance with the second part of the second embodiment.

DESCRIPTION OF THE PREFERRED EMBODIMENTS

Figure 1:
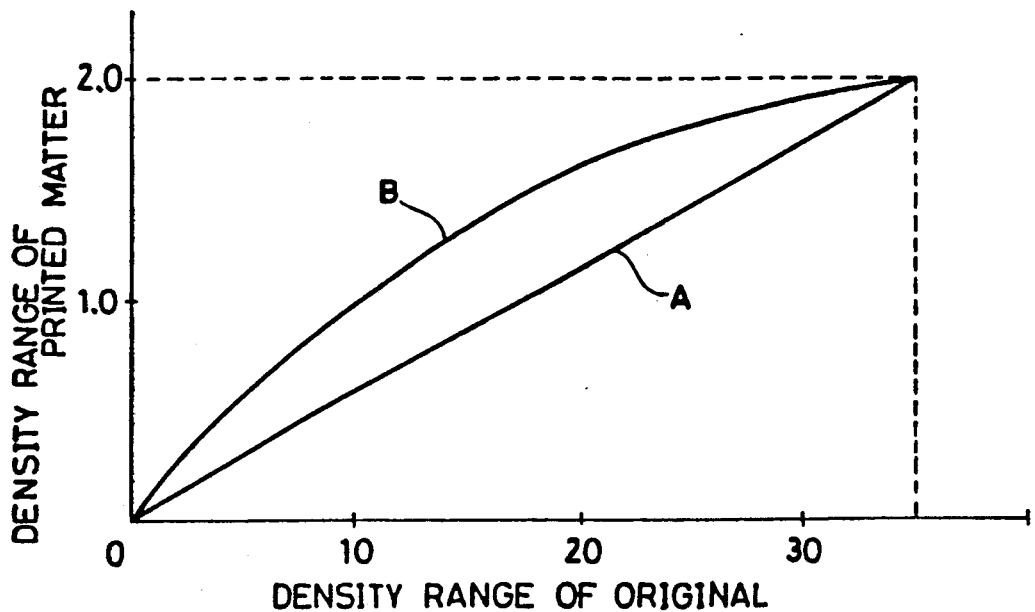
FIG. 1 is a graph showing a relationship between an original density and a print reproduction density, as an example of gradation conversion.

1. First Embodiment (1) Principle of the First Embodiment

First, the principle of the first embodiment of the present invention will be described. In the first embodiment, in association with an input data represented by an integer value, the bit number of an output data is made larger than that of the input data in a LUT for reading a prescribed basic data, the decimal part of the output data approximate to the basic data is represented by the increased bit number, and the expected value of the output data is brought near to the basic data by statistical processing. A detailed description follows.

An input data to the lookup table LUT is represented by x, the data which is made to be close to the basic data represented by a larger number of bits outputted from the lookup table is represented by Y, and a variable data outputted from variable data generating means 10 is represented by R. As noted, the number of bits of the data Y outputted from the lookup table is larger than that of the input data x.

Now, the number of bits of the input data x is m and the number of bits of the output data Y from the lookup table is n (n>m). The data Y can be divided into a higher order m bit data $Y_U$ corresponding to the integer part of the input data x a lower order (n−m) bit data $Y_L$ corresponding to the decimal part thereof. The number of bits of the variable data R is (n−m) which is the same as that of the lower order bit data $Y_L$.

Therefore, the data Y outputted from the lookup table can be represented by $$Y = Y_U \cdot 2^{n-m} + Y_L$$

In consideration of the decimal point, it can be represented by $$\bar{Y} = Y_U + \frac{Y_L}{2^{n-m}} \quad (1)$$

The comparing means 11 compares the lower order bit data $Y_L$ with the variable data R and outputs a single bit signal having a value "1" when $Y_L > R$, and a value of "0" when $Y_L \leq R$. This output "S" of the comparing means 11 is supplied to the adding means 12.

The adder means 12 adds the 1 bit wide signal of "1" or "0" from the comparing means to the higher order bit data $Y_U$ of the data Y outputted from the lookup table.

More specifically, when $Y_L > R$, the final output data y will be the higher order bit data $Y_U$ with "1" added to the least significant bit (LSB) thereof. When $Y_L \leq = R$, there is no such addition and the higher order bit data $Y_U$ directly becomes the final output data Y.

Since the number of bits of the lower order bit data $Y_L$ and of the variable data R is (n−m), the probability $P_1$ of $Y_L > R$ will be $$P_1 = Y_L / 2^{n-m} \quad (2)$$

The probability $P_2$ of $Y_L \leq R$ will be $$P_2 = (1 - Y_L/2^{n-m}) \quad (3)$$

Therefore, the average value (=expected value) $\bar{y}$ of the output data y which is the result of addition, will be $$\bar{y} = (Y_U + 1)\frac{Y_L}{2^{n-m}} + Y_U\left(1 - \frac{Y_L}{2^{n-m}}\right) \quad (4)$$
$$= Y_U + \frac{Y_L}{2^{n-m}}$$

as is evident from the equations (1) and (4), $\bar{y} = \bar{Y}$, that is, the average value (=expected value) of the output data $\bar{y}$ coincides with the basic data.

It shows that the statistical characteristics of the function of the gradation converting circuit in accordance with the present invention coincides with the functional characteristics of the lookup table whose precision is made higher by increasing the number of bits.

In other words, the precision of the statistical characteristics can be improved by increasing the number of bits of the lookup table of variable data generating means and of the comparing means, without increasing the number of bits of the input and output x and y.

Figure 3A:
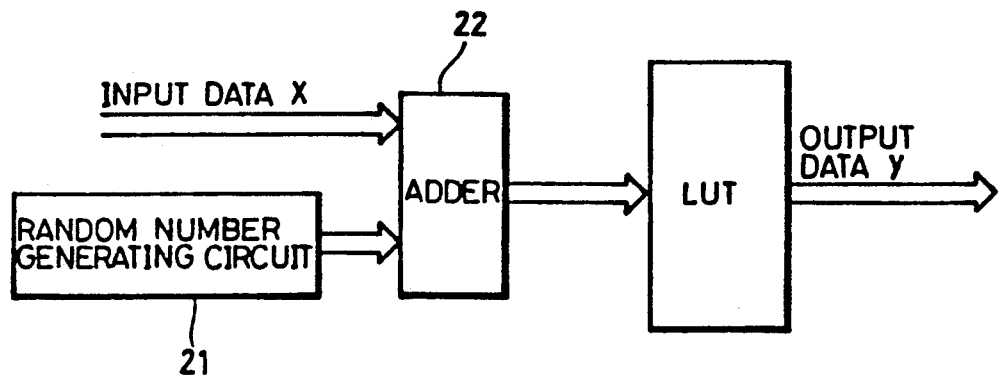
FIGS. 3A and 3B are block diagrams showing conventional methods for minimizing quantization errors.
Figure 3B:
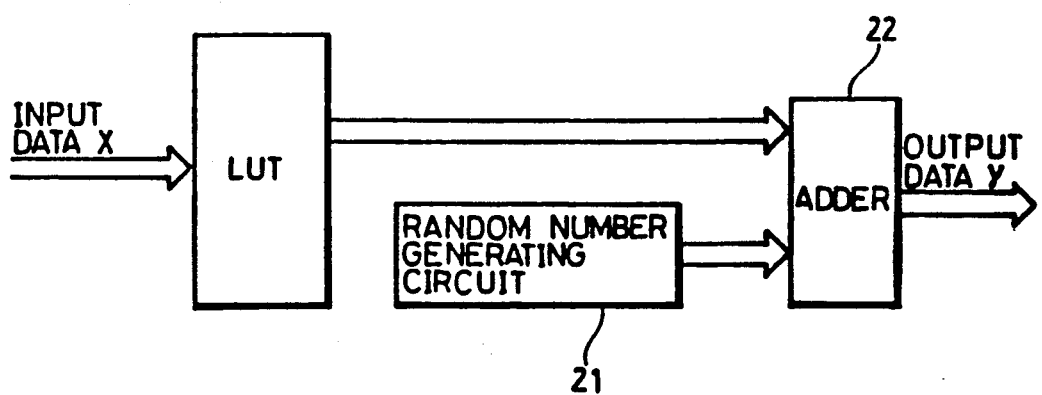

A still more detailed description is given below. For the purpose of providing comparisons, the conventional method shown in FIG. 3B will be described first.

In the prior art, the number of bits (hereinafter "bit number") of the output data y is m when the bit number of the input data x is m. The basic data $y_{obj}$ corresponding to the output data y will be represented by $$Y_{obj} = (a_{m-1} \cdot 2^{m-1} + a_{m-2} \cdot 2^{m-2} + \ldots + a_1 \cdot 2^1 + a_0 \cdot 2^0) \quad (5)$$
$$+ (a_{-1} \cdot 2^{-1} + a_{-2} \cdot 2^{-2} + \ldots + a_{-i} \cdot 2^{-i} \ldots)$$

where the coefficient of each digit $a_{m-1}, a_{m-2}, \ldots, a_1, a_0, a_{-1}, a_{-2}, \ldots, a_{-i} \ldots$ is "0" or "1".

For example, the output data y of m bits will be $$y = a_{m-1} \cdot 2^{m-1} + \ldots + a_1 \cdot 2^1 + a_0 \cdot 2^0 + 1 \quad (6)$$

when $a_{-1} =$ "1".
Or, it will be $$Y = a_{m-1} \cdot 2^{m-1} + \ldots + a_1 \cdot 2^1 + a_0 \cdot 2^0 \quad (7)$$

when $a_{-1} =$ "0". (This operation corresponds to the rounding off operation, that is, counting fractions over ½ as one, and disregarding the rest.)

The error $\Delta_1$ of the output data y in association with the basic data $y_{obj}$ when $a_{-1} =$ "1" will be no more than 0.5 (the order of this is $2^{-1}$), and in general, an error has the order of $2^{-1}$.

The method of the present invention is as follows.

The basic data $y_{obj}$ represented by n bits, which is the output bit number of the lookup table, will be, in accordance with the equation (5), $$Y_{obj} = Y_{obj} \times 2^{n-m} \quad (8)$$
$$= (a_{m-1} \cdot 2^{n-1} + \ldots + a_{-(n-m-1)} \cdot 2^1 +$$
$$a_{-(n-m)} \cdot 2^0) + (a_{-(n-m+1)} \cdot 2^{-1} + \ldots +$$
$$a_{-(n-m+i)} \cdot 2^{-i} + \ldots)$$

The output data Y from the lookup table corresponding to the basic data $Y_{obj}$ will be $$Y = a_{m-1} \cdot 2^{n-1} + \ldots + a_{-(n-m-1)} \cdot 2^1 + a_{-(n-m)} \cdot 2^0 \quad (9)$$

or the above value plus "1". The operation is the rounding off operation, and 1 is added (+1) when $a_{-(n-m+1)}$ is "1".

The higher order m bit data $Y_U$ of the output data Y will be $$\begin{aligned}Y_U &= (a_{m-1} \cdot 2^{n-1} + \ldots + a_1 \cdot 2^{n-m+1} + a_0 \cdot 2^{n-m}) \div 2^{n-m} \\ &= a_{m-1} \cdot 2^{m-1} + \ldots + a_1 \cdot 2^1 + a_0 \cdot 2^0)\end{aligned} \quad (10)$$

which is the same as the output data y (not rounded off) of m bit.

The lower order (n−m) bit data $Y_L$ of the output data Y will be $$Y_L = a_{-1} \cdot 2^{n-m-1} + \ldots + a_{-(n-m-1)} \cdot 2^1 + a_{-(n-m)} \cdot 2^0 \quad (11)$$

Since the bit number of the variable data R is (n−m), the provability $P_1$ that $Y_L > R$ will be, from the equation (11), $$\begin{aligned}P_1 &= Y_L/2^{n-m} \\ &= a_{-1} \cdot 2^{-1} + \ldots + a_{-(n-m)} \cdot 2^{-(n-m)}\end{aligned} \quad (12)$$

The average value (=expected value) $\bar{y}$ is represented by $$\begin{aligned}\bar{y} &= (Y_U + 1) \times P_1 + Y_U \times (1 - P_1) \\ &= Y_U + P_1\end{aligned}$$

and therefore, from the equations (10) and (12), $$\bar{y} = (a_{m-1} \cdot 2^{m-1} + \ldots + a_1 \cdot 2^1 + a_0 \cdot 2^0) + \quad (13)$$
$$(a_{-1} \cdot 2^{-1} + \ldots + a_{-(n-m)} \cdot 2^{-(n-m)} \ldots)$$

The error $\Delta_2$ of the average value (=expected value) $\bar{y}$ in association with the basic data $y_{obj}$ will be, from the equations (5) and (13), $$\begin{aligned}\Delta_2 &= \bar{y} - y_{obj} \\ &= -(a_{-(n-m+1)} \cdot 2^{-(n-m+1)} + \\ &\quad a_{-(n-m+2)} \cdot 2^{-(n-m+2)} + \\ &\quad a_{-(n-m+3)} \cdot 2^{-(n-m+3)} + \ldots)\end{aligned} \quad (14)$$

The order of the error $\Delta_2$ is no more than $2^{-2}$ even in the case (n−m) is "1", and the order is no more than $2^{-3}$ in general.

Namely, according to the present invention, the order of the error of the average value (=expected value) $\bar{y}$ in association with the basic data is no more than $2^{-3}$ in general when (n−m) is more than "2". In the prior art, the order of the error is generally $2^{-1}$. Therefore, the order of the error can be made small by at least 1 order (when n−m = 1), and the average value (=expected value) $\bar{y}$ can be brought nearer to the basic data $y_{obj}$ as compared with the prior art.

The order of the error can be made smaller (for example, the order of the error will be $2^{-5}$ when n−m=4) by increasing the bit number n of the output data Y from the lookup table, whereby the average value (=expected value) $\bar{y}$ of the output data y substantially coincides with the basic data.

Figure 4A:
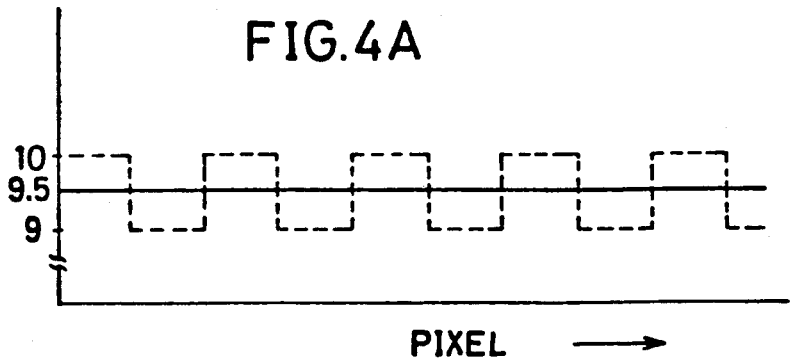
FIGS. 4A and 4B illustrate effects of the present invention.
Figure 4B:
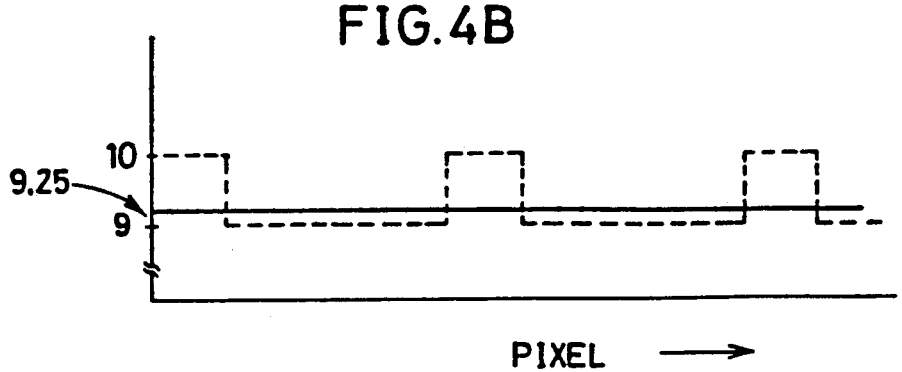

The advantages brought about when the average value $\bar{y}$ of the output data y is made substantially equal to the basic data will be described. FIG. 4A illustrates the effect of the invention, showing the actual gradation output data when the basic data is 9.5, and the output data is represented by 9 or 10. In the figure, the x axis represents the number of pixels while y axis represents the density of pixels. The basic data is represented by a solid line and the actual output data is represented by the dotted line. The average value (expected value) of the actual output data (dotted line) coincides with the basic data. Therefore, the gradation of the figure represented by the dotted gradation line substantially coincides with the gradation represented by the solid line of the basic data, when viewed macroscopically. FIG. 4B is similar to FIG. 4A, showing the actual gradation output data when the basic data is 9.25 and output data is represented by 9 or 10.

(2) Actual Operation of the First Embodiment

One embodiment of the present invention will be described in detail with reference to the figures.

Figure 6:
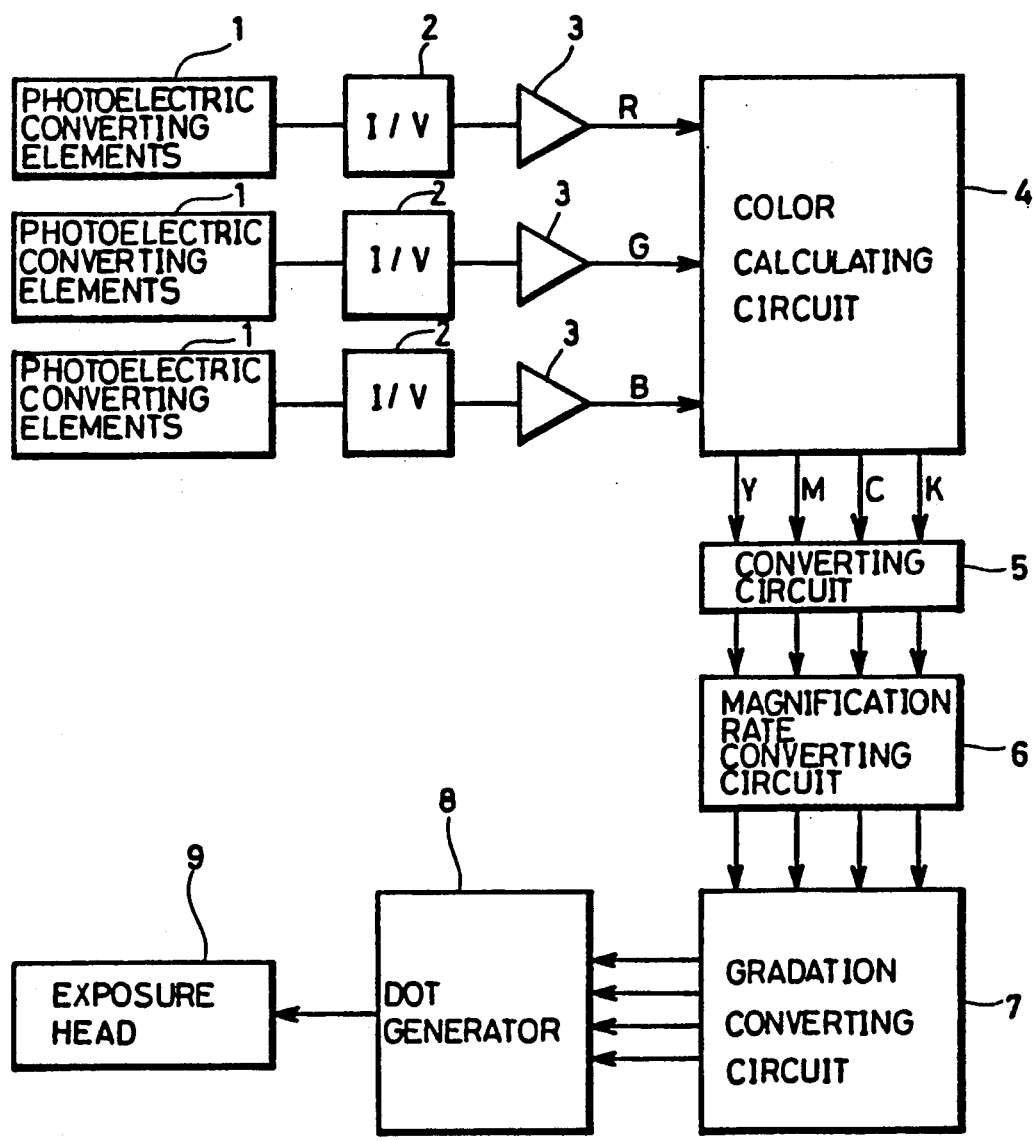
FIG. 6 is a schematic block diagram of a color scanner to which the gradation converting circuit of the present invention is applied.

FIG. 5 is a block diagram of a gradation converting circuit employing a lookup table in accordance with a first embodiment of the present invention, and FIG. 6 is a schematic block diagram of a color scanner in which the gradation converting circuit is employed.

Referring to FIG. 6, the color scanner including the gradation converting circuit 7 of the present invention comprises a photoelectric converting element 1 which optically reads the density of an original on a pixel by pixel basis to convert the same into a current. An I/V converts circuit 2 converting the current into voltage and supplies it to a voltage amplifier 3. Three sets of these circuits are provided for three primary colors of light, that is, R, G and B (red, green, blue). Filters of R, G and B are provided directly in front of each of the photoelectric converting elements 1.

The color scanner further comprises color calculation circuit (analog type) 4 for converting the R, G and B signals inputted from the three voltage amplifiers 3 to Y, M, C and K (yellow, magenta, cyan, black) signals which are the colors used for printing; an A/D converting circuit 5; magnification rate converting circuit 6; the gradation converting circuit 7 in accordance with the embodiment of the present invention; a dot generator 8 for forming dots; and an exposure head 9.

The A/D converting circuit 5 and the magnification rate converting circuit 6 may be arranged before the color calculation circuit 4 and, in that case, a digital type color calculation circuit 4 is employed.

The gradation converting circuit 7 is structured as shown in FIG. 5. Referring to FIG. 5, a lookup table LUT to which m bit digital data x of an image is inputted, outputs a data Y of n bits (n>m), that is the number of bits n is larger than that of the number of bits m of the input data x.

In this lookup table LUT, data in accordance with a desired input/output converting characteristics are stored. Since the number of bits n of the output data Y is larger than the number m of the prior art, the lookup table LUT has smaller errors in quantization.

However, the number of bits of the final output data y to be outputted to the dot generator 8 is predetermined. The number of bits of the final output data y is determined to be m which is the same as the number of bits of the input data x as in the prior art.

The output data Y from the lookup table LUT cannot be directly outputted since the number of bits n of the output data Y is larger than that of the final output data y. Therefore, the n bit output data Y is divided into a higher order m bit data $Y_U$ corresponding to an integer part and a lower order (n−m) bit data $Y_L$ corresponding to an decimal part.

The number of bits of a variable data R which is outputted from variable data generating means 10 is (n−m), which is the same as that of the lower order (n−m) bit data $Y_L$. The variable data R changes time sequentially with a uniform probability distribution.

The variable data generating means 10 updates the variable data R to be outputted at every input of the clock corresponding to the pixel signal of 1 pixel.

A random number generating circuit, a quasi random number generating circuit, or a pattern generating circuit storing a prescribed pattern and cyclically reading the same may be employed as the variable data generating means 10.

A comparing means 11 is provided for comparing the lower order (n−m) bit data $Y_L$ and the variable data R. When the lower order bit data $Y_L$ is larger than the variable data R ($Y_L > R$), a 1 bit signal S of "1" is outputted. When the lower order bit data $Y_L$ is the same as, or smaller than the variable data R ($Y_L \leq R$), a 1 bit signal S of "0" is outputted. The result "0" or "1" of the comparison is transmitted to the adding means, where the 1 bit signal S is added to the LSB (least significant bit) of the higher order m bit data $Y_U$, with the result of addition outputted to the dot generator 8 as the final output data y.

The number of bits of the output data y from the adder means 12 is m, which is the same as that of the higher order bit data $Y_U$. If it should be (m+1) bits due to the overflow resulting from the addition, the carry is prohibited, whereby the m-bit data is outputted.

The specific examples of the numerical value conversion is shown in the following table.

Figure 2:
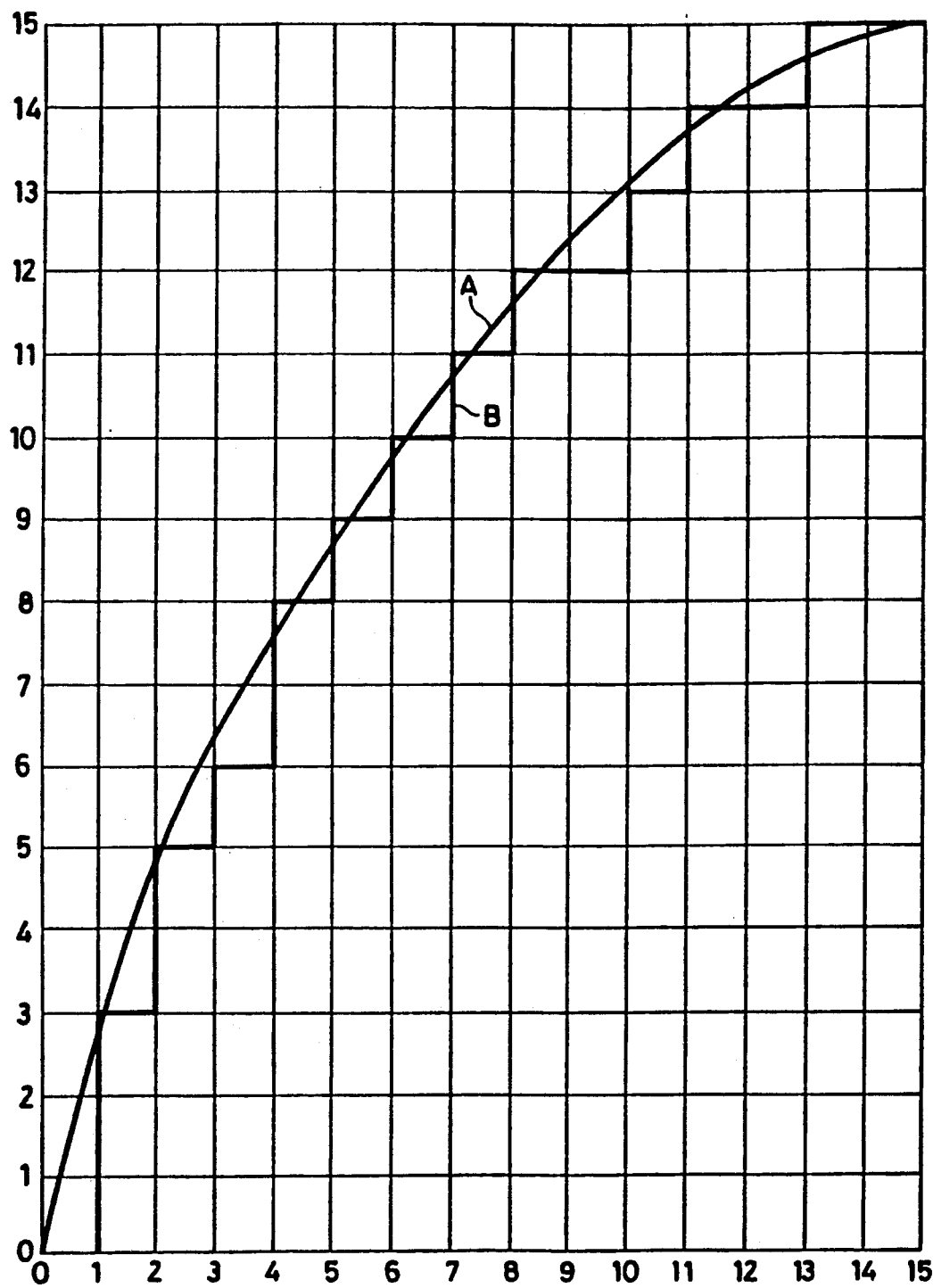
FIG. 2 is a graph showing a relation between a gradation curve which is the base for forming a lookup table and the digitized data thereof.

The table shows the input/output characteristics of the present invention in association with the converting characteristics shown in FIG. 2 in order to provide a comparison to the input/output characteristics of the prior art.

The number of bits of the input data x is 4 bits, the number of bits of the final output data y is 4 bits and the number of bits of the output data Y from the lookup table LUT is 6 bits. The value of the output data is the basic data rounded off in the input/output converting characteristics.

TABLE (Comparison between Input/Output Characteristics of the Present Invention and the Prior Art)

| | | | | | | | | | |
|---|---|---|---|---|---|---|---|---|---|
| ① | Input Data | 0 | 1 | 2 | 3 | 4 | 5 | 6 | 7 | 8 |
| ② | Basic Data (yobj) | 0.00 | 2.75 | 4.8 | 6.25 | 7.5 | 8.6 | 9.75 | 10.75 | 11.6 |
| ③ | Output Data y of the Prior Art | 0 | 3 | 5 | 6 | 8 | 9 | 10 | 11 | 12 |
| ④ | 6 bit Converted Value (Yobj) | 0 | 11.0 | 19.2 | 25.0 | 30.0 | 34.4 | 39.0 | 43.0 | 46.4 |
| ⑤ | Output Data Y from LUT | 0 | 11 | 19 | 25 | 30 | 34 | 39 | 43 | 46 |
| ⑥ | 6 bit representation of ⑤(Y) | 000000 | 001011 | 010011 | 011001 | 011110 | 100010 | 100111 | 101011 | 101110 |
| ⑦ | Higher Order Bit Data Yu | 0000 (0) | 0010 (2) | 0100 (4) | 0110 (6) | 0111 (7) | 1000 (8) | 1001 (9) | 1010 (10) | 1011 (11) |
| ⑧ | Lower Order Bit Data $Y_L$ | 00 (0) | 11 (3) | 11 (3) | 01 (1) | 10 (2) | 10 (2) | 11 (3) | 11 (3) | 10 (2) |
| ⑨ | $Y_L > R$ Probability $P_1$ | 0/4 | 3/4 | 3/4 | 1/4 | 2/4 | 2/4 | 3/4 | 3/4 | 2/4 |
| ⑩ | Distribution of Final Output Delay | | | | | | | | | |
| | (a) | 0 | 2 | 4 | 6 | 7 | 8 | 9 | 10 | 11 |
| | (b) | 0 | 3 | 5 | 6 | 7 | 8 | 10 | 11 | 11 |
| | (c) | 0 | 3 | 5 | 6 | 8 | 9 | 10 | 11 | 12 |
| | (d) | 0 | 3 | 5 | 7 | 8 | 9 | 10 | 11 | 12 |
| ⑪ | Average Value of (a)~(d) (= expected value) $\bar{y}$ | 0.00 | 2.75 | 4.75 | 6.25 | 7.50 | 8.50 | 9.75 | 10.75 | 11.50 |
| ⑫ | Error from Basic Data $\Delta_1$ (Prior Art) | 0.00 | 0.25 | 0.20 | 0.25 | 0.50 | 0.40 | 0.25 | 0.25 | 0.40 |
| ⑬ | Error from Basic Data $\Delta_2$ (Present Invention) | 0.00 | 0.00 | 0.05 | 0.00 | 0.00 | 0.10 | 0.00 | 0.00 | 0.10 |
| ① | Input Data | 9 | 10 | 11 | 12 | 13 | 14 | 15 | | |
| ② | Basic Data (yobj) | 12.3 | 13.1 | 13.75 | 14.2 | 14.6 | 14.85 | 15 | | |
| ③ | Output Data y of the Prior Art | 12 | 13 | 14 | 14 | 15 | 15 | 15 | | |
| ④ | 6 bit Converted Value (Yobj) | 49.2 | 52.4 | 55.0 | 56.8 | 58.4 | 59.4 | 60.0 | | |
| ⑤ | Output Data Y from LUT | 49 | 52 | 55 | 57 | 58 | 59 | 60 | | |
| ⑥ | 6 bit representation of ⑤(Y) | 110001 | 110100 | 110111 | 111001 | 111010 | 111011 | 111100 | | |
| ⑦ | Higher Order Bit Data Yu | 1100 (12) | 1101 (13) | 1101 (13) | 1110 (14) | 1110 (14) | 1110 (14) | 1111 (15) | | |
| ⑧ | Lower Order Bit Data $Y_L$ | 01 (1) | 00 (0) | 11 (3) | 01 (1) | 10 (2) | 11 (3) | 00 (0) | | |

TABLE-continued (Comparison between Input/Output Characteristics of the Present Invention and the Prior Art)

| | | | | | | | | |
|---|---|---|---|---|---|---|---|---|
| ⑨ | $Y_L > R$ Probability $P_1$ | 1/4 | 0/4 | 3/4 | 1/4 | 2/4 | 3/4 | 0/4 |
| 10 | Distribution of Final Output Delay | | | | | | | |
| | (a) | 12 | 13 | 13 | 14 | 14 | 14 | 15 |
| | (b) | 12 | 13 | 14 | 14 | 14 | 15 | 15 |
| | (c) | 12 | 13 | 14 | 14 | 15 | 15 | 15 |
| | (d) | 13 | 13 | 14 | 15 | 15 | 15 | 15 |
| 11 | Average Value of (a)~(d) (= expected value) $\bar{y}$ | 12.25 | 13.00 | 13.75 | 14.25 | 14.50 | 14.75 | 15.00 |
| 12 | Error from Basic Data $\Delta_1$ (Prior Art) | 0.30 | 0.10 | 0.25 | 0.20 | 0.40 | 0.15 | 0.00 |
| 13 | Error from Basic Data $\Delta_2$ (Present Invention) | 0.05 | 0.10 | 0.00 | 0.05 | 0.10 | 0.10 | 0.00 |

The input/output converting characteristics of the prior art shown in FIG. 2 is as shown in lines 1, 2 and 3.

For example, when x=6, the basic data is 9.75, and thus y=10 by rounding off. The error $\Delta_1$ of the output data y in association with the basic data is $\Delta_1=0.25$. Errors $\Delta_1$ for respective input x are shown in the line 12 of the table.

The basic data converted from 4 bits to 6 bits is shown in the line ④ of the table. The basic data of 6 bits is provided by multiplying the basic data of 4 bits by $2^6 \div 2^4 = 4$.

For example, when x=6, the basic data will be $9.75 \times 4 = 39.0$.

In the line ⑤, the value of the output data Y from the lookup table LUT is shown, which is obtained by rounding off the value in the line ④. In the line ⑥, the values of the line ⑤ are represented by 6 bit binary number.

In the line ⑦, the higher order 4 bit data $Y_U$ of the 6 bit data of the line ⑥ is shown and in the line ⑧, the lower order 2 bit data $Y_L$ of the 6 bit data of the line ⑥ is shown. The corresponding decimal representation is shown in the brackets of the lines ⑦ and ⑧.

For example, when x=6, the output data Y is [100111]=(39), $Y_U$=[1001]=(9) and $Y_L$=[11]=(3).

In the line ⑨, the probability $P_1$ that the lower order bit data $Y_L$ becomes larger than the variable data R ($Y_L > R$) is shown. The variable data R comprises 2 bits and outputs [00], [01], [10] and [11] with the same probability.

(a) to (d) in the line ⑩ shows the distribution of the final output data y based on the probability $P_1$ of the line ⑨.

For example, when x=6, the probability $P_1 = \frac{3}{4}$, so that the probability that the 1 bit signal S=1 is added to the higher order bit data $Y_U$=9 in the adding means 12 is $\frac{3}{4}$, whereby the distribution becomes "9, 10, 10, 10".

In the line ⑪, the average value (=expected value) $\bar{y}$=((a)+(b)+(c)+(d))/4 of (a)~(d) in the line ⑩ is shown. When x=6, the value becomes 9.75.

In the line ⑬, the error $\Delta_2$ of the average value (=expected value) $\bar{y}$ in association with the basic data of the line ② is shown. When x=6, the error $\Delta_2$=0.00, which means that the average value (=expected value) $\bar{y}$ of the final output data y precisely coincides with the basic data.

The error $\Delta_2$ is less than 0.10 irrespective of the value of the input data x, which is smaller than that of the prior art. Namely, a value nearer to the basic data can be provided. Since the maximum error $\Delta_2=0.10$ is decimal representation, it has the order of $2^{-4}$ in the binary representation. This is apparent from the following relation, that is, $$2^{-4} = 0.0625 > 0.10 > 0.125 = 2^{-3}$$

If the present invention should be applied to image processing apparatus employing a scanner and the like in the process of reproduction, it is preferred that the input is 8 bits, Y is 12 bits, $Y_U$ and y are 8 bits, respectively and $Y_L$ is 4 bits.

As is apparent from the foregoing, the statistical characteristics of the lookup table LUT in accordance with the embodiment of the present invention becomes a smooth basic characteristics such as shown by the curve A in FIG. 2. On the other hand, in the prior art shown in FIG. 3B, the statistical characteristics of the lookup table is such as shown by the line B. The statistical characteristics means the average values $\bar{y}$ of the output data y which are random numbers, in association with a certain input data x.

The number of bits of the input data x and the number of bits of the final output data y is the same in the above embodiment, it is not limited to this and the number of bits of the final output data y may be smaller than that of the input data x. This is advantageous when the number of bits of the output data y must be made small.

While a binary system is employed in this embodiment, the technical concept of the present invention is not limited to a binary system. It may be applied to a ternary system and so on. In such case, the higher order bits and the lower order bits may be set as higher order figures and lower order figures.

The lookup table LUT may be formed in an ROM or an RAM, or it may be structured by an LSI together with the variable data generating means 10, comparing means 11 and the addition means 12.

2. Second Embodiment (1) Principle of the Second Embodiment

The principle behind a second embodiment of the present invention is as follows.

In the second embodiment, instead of a fixed lookup table of one input/output converting characteristic a plurality of lookup tables are provided, each of which has different input/output converting characteristics. The lookup table to be used is selected at random.

Let it be assumed that the input data is $x_j$ (j is a continuous integer) and the basic data $y_j$ of the converted data corresponding to the input data $x_j$ is represented by a sum of an integer part $I_j$ and a decimal part $\alpha_j$ ($y_j = I_j + \alpha_j$; $0 \leq \alpha_j < 1$). A total of (N) LUTs is provided. The converted data of $(1-\alpha_j) \cdot N$ lookup tables or of the lookup tables of an integer nearest thereto is determined as $y_j = I_j$. The converted data of the remaining lookup tables out of the N lookup tables is determined as $y_j = I_j + 1$.

When $(1-\alpha_j) \cdot N$ is not an integer, the number of the lookup tables $(1-\alpha_j) \cdot N$ converting $y_j = I_j$ is rounded off or rounded down to be an integer number $n_j (\approx (1-\alpha_j) \cdot N)$ which is closest to the value $(1-\alpha_j) \cdot N$. The number of the lookup tables converting $y_j = I_j + 1$ is selected to be $m_j = N - n_j (\approx \alpha_j N)$.

A certain lookup table is selected by a selecting signal outputted from the random number generating circuit in synchronization with the input of the input data $x_j$. The selected lookup table is either the table converting the input data $x_j$ to the output data $y_j = I_j$ or the table converting the input data to the output data $y_j = I_j + 1$.

The probability that the selecting signal from the random number generating circuit will select the former lookup table ($x_j \to y_j = I_j$) is $n_j/N \approx \{(1-\alpha_j) \cdot N\}/N = 1 - \alpha_j$, and the probability of selecting the latter lookup table ($x_j \to y_j = I_j + 1$) is $m_j/N \approx \alpha_j \cdot N/N = \alpha_j$.

Namely, $y_j = I_j$ is outputted as the output data $y_j$ substantially by the probability of $(1-\alpha_j)$, and $y_j = I_j + 1$ is outputted by the probability of $\alpha_j$.

Therefore, the average value (=expected value) $\bar{y}_j$ of the output data $y_j$ becomes $\bar{y}_j = (1-\alpha_j) \cdot I_j + \alpha_j (I_j + 1) = I_j + \alpha_j$, which coincides with the basic data.

(2) Specific Operation of the Second Embodiment

The present embodiment of the present invention is described in detail below by reference to the figures.

(A) Part 1 of the Second Embodiment

Figure 7:
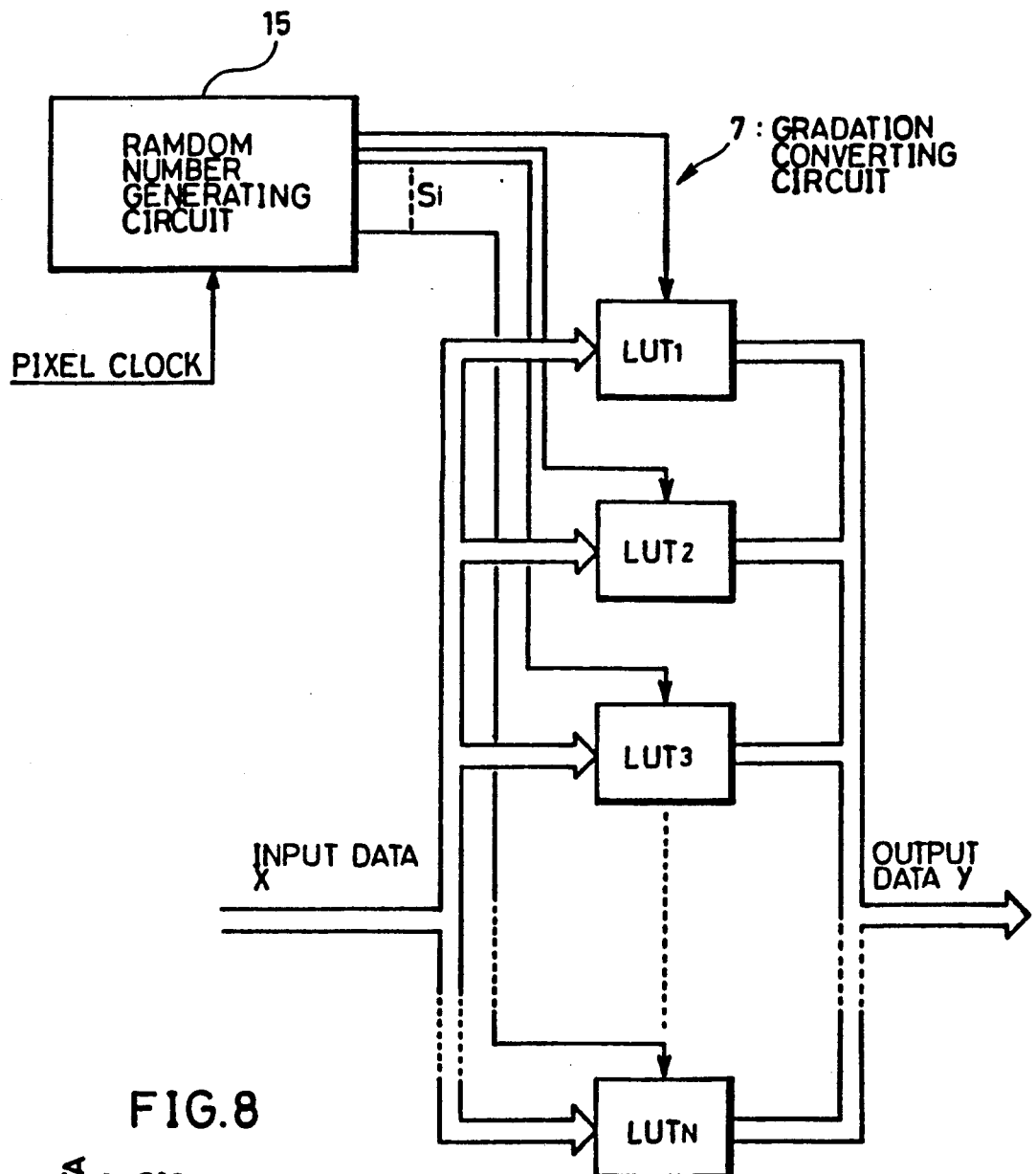
FIG. 7 is a block diagram of a gradation converting circuit employing a LUT in accordance with a first part of a second embodiment.
Figure 8:
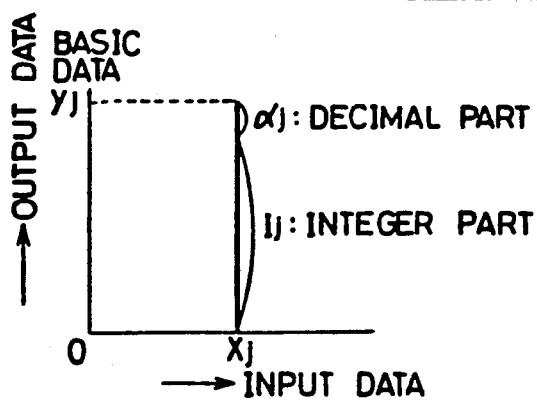
FIG. 8 is a graph showing a relation between input data and basic data.
Figure 9:
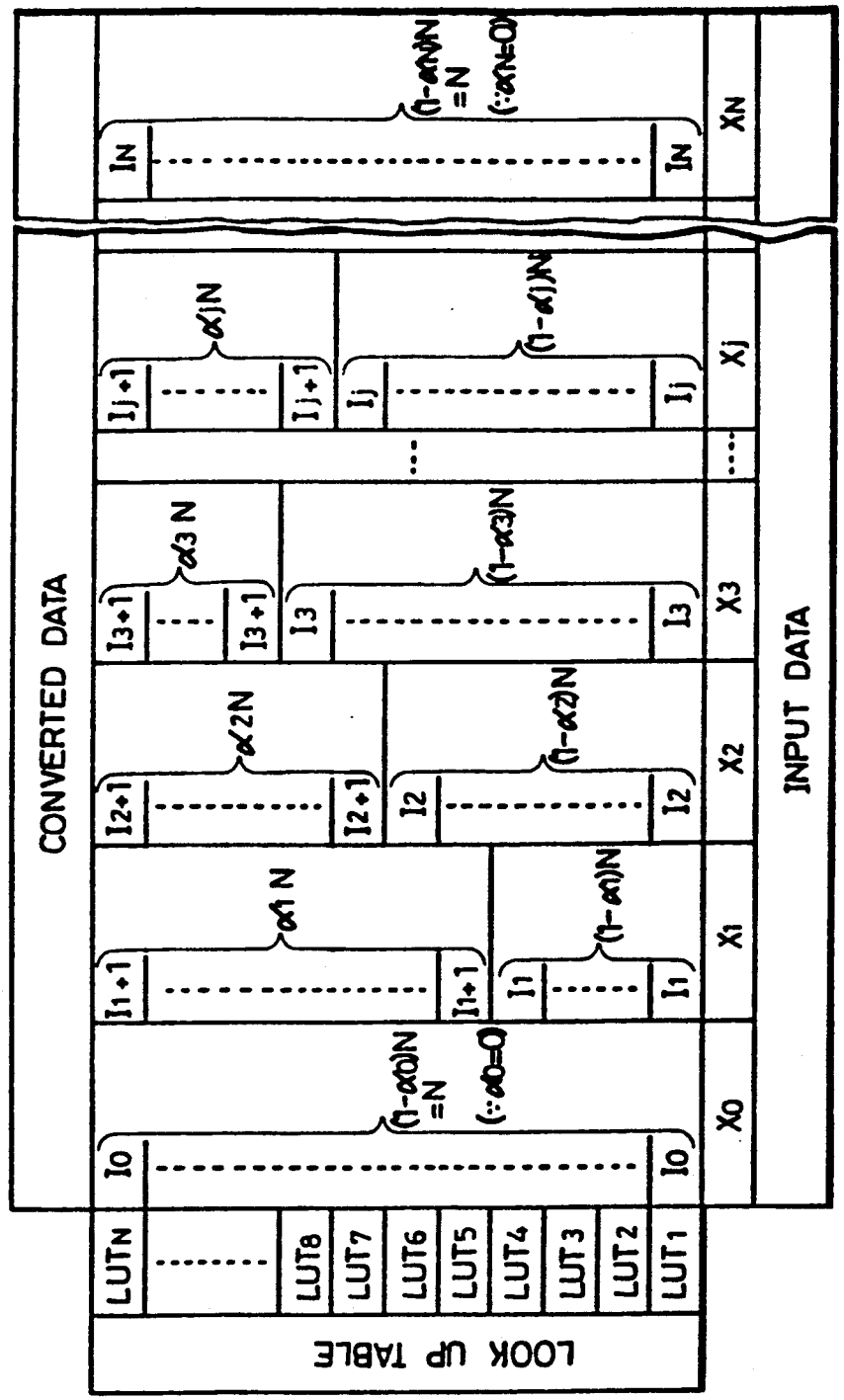
FIG. 9 is a schematic diagram showing input/output converting characteristics of an LUT in the gradation converting circuit.

FIG. 7 is a block diagram of a gradation converting circuit employing a lookup table in association with part 1 of the second embodiment, FIG. 8 shows the relation between the input data and the basic data, and FIG. 9 is a schematic diagram showing input/output converting characteristics of the lookup table in the gradation converting circuit.

The schematic block diagram of the color scanner in which the gradation converting circuit of the second embodiment is applied is the same as in FIG. 6.

The gradation converting circuit 7 comprises, as shown in FIG. 7, a plurality of (N) lookup tables $LUT_1$ to $LUT_N$ having different input/output converting characteristics, a random number generating circuit 15 separately outputting selecting signals $S_i$ as random number data for respective lookup tables $LUT_i$ for randomly selecting one lookup table $LUT_i$ out of these N lookup tables $LUT_1$ to $LUT_N$. The random number generating circuit 15 updates the random number data to be outputted at every clock pulse, i.e. at every pixel. The lookup tables $LUT_1$ to $LUT_N$ may be constructed of ROMs or RAMs.

The same input data x is inputted to each of the plurality of lookup tables $LUT_1$ to $LUT_N$. One of the plurality of lookup tables $LUT_1$ to $LUT_N$ is selected, i.e. enabled, by a selecting signal $S_i$ outputted from the random number generating circuit 15. The output data y of the selected $LUT_N$ is then in accordance with the input/output converting characteristics stored beforehand in the lookup table $LUT_i$ is outputted from the selected lookup table $LUT_i$.

A method for forming the input/output converting characteristics of N lookup tables $LUT_1$ to $LUT_N$ is described next.

Referring to FIG. 2, when $x = 6$, the output data $y = 9.3$ on the curve A representing the basic characteristics. In the digital representation, the value becomes $y = 9$ by rounding off as shown by the line B.

In view of the foregoing, in the present invention, when $x = 6$, sometimes the value y is 9 and sometimes it is 10 in forming the input/output converting characteristics of the N lookup tables $LUT_1$ to $LUT_N$. When the number of curves representing $y = 9$, that is, the number of lookup tables is denoted by the character n and the number of curves representing $y = 10$ (the number of the lookup tables) is denoted by the character m, then the expected value $\bar{y}$ of the output data y when $x = 6$ will be represented by $$\bar{y} = \frac{n \cdot 9 + m \cdot 10}{m + n} \quad (15)$$

Since this value should be 9.3, $$\frac{n \cdot 9 + m \cdot 10}{m + n} = 9.3 \quad (16)$$

The total number of the lookup tables $LUT_1$ to $LUT_N$ is N, and therefore $$m + n = N \quad (17)$$
$$\therefore m = N - n$$

By substituting the equation (17) for (16), $$N \cdot 9 + (N - n) \cdot 10 = 9.3N$$
$$\therefore n = 0.7N$$
$$\therefore m = 0.3N$$

Namely, when $x = 6$, the output data y uniformly becomes 9.3 to coincide with the basic data by setting the number n of the lookup tables outputting $y = 9$ at 0.7N and by selecting the number M of the lookup tables outputting $y = 10$ at 0.3N. In general, when the basic data $y_j$ of the converted data corresponding to the input data $x_j$ (j is a continuous integer) is represented by an integer part $I_j$ and a decimal part $\alpha_j$ ($y_j = I_j + \alpha_j$; $0 \leq \alpha_j < 1$) as shown in FIG. 8, the input/output converting characteristics of each of the said N lookup tables $LUT_1$ to $LUT_N$ are determined based on the following rule: namely, the converted data of $(1-\alpha_j) \cdot N$ lookup tables is selected to be $y_j = I_j$ and the converted data of the remaining lookup tables is set to $y_j = I_j + 1$.

Since the value $(1-\alpha_j) \cdot N$ is not always an integer, the number $(1-\alpha_j) \cdot N$ of the lookup tables converting $y_j = I_j$ must be as by rounding off, rounded up or rounding down to provide an integer $n_j$ nearest to the value $(1-\alpha_j) \cdot N$, and the number of lookup tables converting $y_j = I_j + 1$ is $m_j = N - n_j$.

FIG. 9 is a schematic diagram showing the input/output converting characteristics of the lookup tables $LUT_1$ to $LUT_N$ obtained in this manner. The larger the value of the decimal part $\alpha_j$, the larger the number of the lookup tables converting the data $y_j = I_j + 1$. The smaller the value of $\alpha_j$, the larger the number of the lookup tables converting the $y_j = I_j$.

In FIG. 9, the data $I_j$ has been condensed on the side of the lookup table $LUT_1$ and the data $I_j+1$ on the side of the lookup table $LUT_N$. However, where the location of and the distribution of the data $I_j$ and $I_j+1$ in the lookup tables $LUT_1$ to $LUT_N$ is completely arbitrary.

When the basic data $y_j$ for the input data $x_j$ is an integer with the decimal part $a_j$ being 0, the converted data $y_j$ for the input data $x_j$ becomes $I_j$ in each of the lookup tables $LUT_1$ to $LUT_N$.

For example, in FIG. 2, the basic data $y_0$ for the input data $x_0$ is 0, so that the converted data of each of the lookup tables is 0. Since the basic data $y_{15}$ for the input data $x_{15}$ is 15, the converted data of each of the lookup tables is 15. Similarly, when $x=8$, $y=11.0$. That is, when $x=8$, there is no error in quantization in the output y, so that exact output can be provided. In this case, since the plurality of lookup tables $LUT_1$ to $LUT_N$ all provide the value of $y=11$, the data 11 is outputted not at random but in an exact determinative rather than statistical manner.

In consideration of the similar characteristics, the converted data $I_0$ for the input $x_0$ are all 0 and the converted data $I_N$ for the input $x_N$ all have required values in FIG. 9.

The statistical characteristics of the lookup tables $LUT_1$ to $LUT_N$ having the input/output converting characteristics as described above becomes that basic characteristics as smooth as the curve A in FIG. 2.

As is apparent from the foregoing, by selecting a plurality of lookup tables $LUT_1$ to $LUT_N$ having different input/output converting characteristics based on a selecting signal $S_i$ constituted by random number data, randomness can be used without introducing noise in digital gradation converting circuits.

(B) Part 2 of the Second Embodiment

Figure 10:
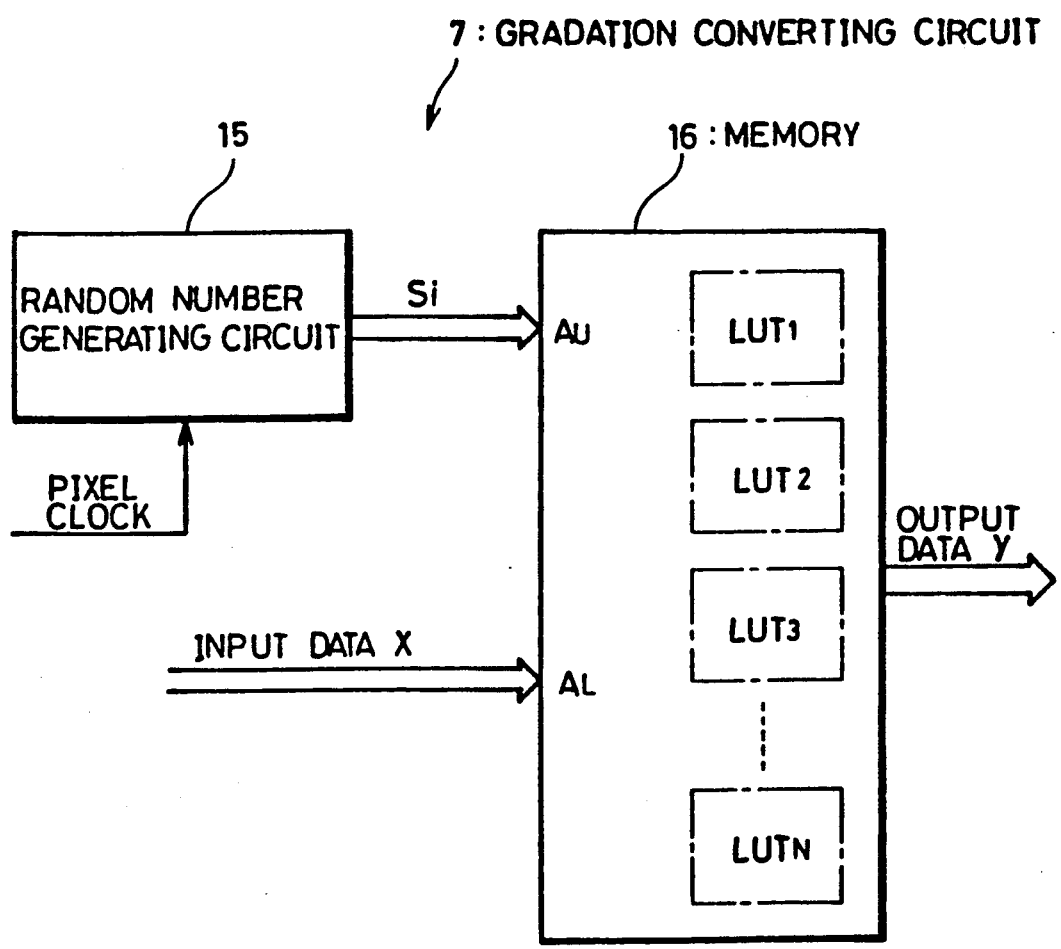
FIG. 10 is a block diagram of a gradation converting circuit employing a LUT in accordance with a second part of a second embodiment.

FIG. 10 is a block diagram of a gradation converting circuit employing LUTs in accordance with part 2 (a second variation) of the second embodiment.

The gradation converting circuit 7 of the second variation of the second embodiment comprises a single memory 16 and a random number generating circuit 15 as shown in FIG. 10. Data corresponding to a plurality of (N) lookup tables $LUT_1$ to $LUT_N$ are stored in the single memory 16. The memory 16 comprises a ROM and a RAM.

The selecting signal $S_i$ that is outputted from the random number generating circuit 15 is applied to a higher order address $A_U$ of the memory 16 and the input data x is inputted to the lower order address $A_L$ of the memory 16. Although the size of the memory 16 is N times as large as one lookup table of the first embodiment, recently introduced total memory size is the same. Since the memory devices are very large, the above does not increase cost.

When the bit number of the data x and y is 8 and the number of the lookup tables $LUT_1$ to $LUT_N$ is 16, for example, the memory size will be $2^8 \times 16 = 4K$ byte such memories being commonly available in 1 chip configurations.

The method for forming the input/output converting characteristics of the lookup tables $LUT_1$ to $LUT_N$ is the same as that in the first embodiment. One example of a schematic diagram showing the input/output converting characteristics is shown in FIG. 11.

When a synthesized signal of the selecting signal $S_i$ and the input data $x_j$ is inputted as an address signal to the memory 16, one lookup table $LUT_i$ is selected out of the N lookup tables $LUT_1$ to $LUT_N$, and the converted data corresponding to $x_j$ of the table is outputted from the memory 16 as the output data $y_j$.

Although the lookup tables $LUT_1$ to $LUT_N$ are formed in a ROM or a RAM in each of the above described embodiments, the same may be implemented in an LSI integrated circuit and include the random number generating circuit as well.

As described above, the present invention enables, by making the number of output data from the LUT larger than that of the input data bits, or by preparing a plurality of LUTs, a plurality of output values to be prepared for each input data. One output data is selected from the plurality of output values utilizing comparing means or a random number generating circuit and the average value (=expected value) of the output data and the basic data, which is a prescribed output data, is made substantially equal to each other. Therefore, when a plurality of output data are provided for a plurality of pixels, the data which is microscopic in accordance with a required converting characteristic are provided from the gradation converting circuit. Thereby, problems such as tone jump or false contour line occurring between adjacent pixel groups are eliminated and delicate changes of gradation can be reproduced.

The number of bits of the output data need not be increased more than a reasonable number, and there will be no noise introduced therein.

Although the present invention has been described and illustrated in detail, it should be clearly understood that the same is by way of illustration and example only and is not to be taken by way of limitation, the spirit and scope of the appended claims.

What is claimed is:

1. A gradation converting circuit for receiving a stream of digital input data, each digital input data having a first plurality of bits indicative of an input image pixel value and for outputting, in response to each said first plurality of bits, a second plurality of bits comprising digital output data in the form of an output image pixel value, said circuit comprising:

basic data storing means for defining a prescribed basic data determined in an analog manner corresponding to said input data;

output value preparing means for preparing a plurality of first output values for said input data;

output value selecting means for selecting a single second output value from the first output values, said second output value corresponding to said output data; and output value adjusting means for controlling said selecting means such that the average of said second output value being outputted for respective ones of said input data is comparatively nearer to said basic data.

2. A gradation converting circuit according to claim 1, wherein said output value preparing means comprises a lookup table for preparing a third output value corresponding to said input data.

3. A gradation converting circuit according to claim 2, wherein each said basic data is represented by a sum of a prescribed integer value and a prescribed decimal value, each said third output value is comprised of a third plurality of bits and the third plurality of bits is larger than said first plurality of bits, said third output value, represented by said third plurality of bits, being comparatively near to said basic data, and comprising said prescribed first integer value having said first plurality of bits and said decimal value having a fourth plurality of bits and the number of fourth plurality of bits being equal to the difference between said first plurality of bits and said third plurality of bits.

4. A gradation converting circuit according to claim 3, wherein said output value adjusting means comprises variable data generating means for generating a variable data having said fourth plurality of bits, and comparing means for comparing said variable data to said decimal value having said fourth plurality of bits and for outputting a result of said comparison, said output value selecting means comprises adding means for adding a prescribed second integer value to said prescribed first integer value based on said result of said comparison to obtain a third integer value, and said first output value comprises said prescribed first integer value and said third integer value.

5. A gradation converting circuit according to claim 4, wherein said adding means adds said prescribed second integer value when the decimal value is larger than said variable data.

6. A gradation converting circuit according to claim 5, wherein said prescribed second integer value equals 1.

7. A gradation converting circuit according to claim 6, wherein said second plurality of bits equals said first plurality of bits.

8. A gradation converting circuit according to claim 6, wherein said second plurality of bits is smaller than said third plurality of bits.

9. A gradation converting circuit according to claim 5, said output value preparing means comprising a memory.

10. A gradation converting circuit according to claim 9, wherein said memory comprises a ROM and
said lookup table is contained in said ROM.

11. A gradation converting circuit according to claim 9, wherein said memory comprises a RAM, and
said lookup table is contained in said RAM.

12. A gradation converting circuit according to claim 5, further comprising output value outputting means for outputting said second output value selected by said output value selecting means respectively for a plurality of pixels, wherein said output value outputting means outputs said prescribed first integer value for a portion of a predetermined plurality of pixels and outputs said third integer value for the remaining portion of pixels, and an expected value of said second output value for said plurality of pixels is comparatively near to said basic data.

13. A gradation converting circuit according to claim 2, including additional lookup tables to provide a plurality of lookup tables; and wherein:

said third output value comprises said first output value;

said third output value comprises a first value and a second value represented by said second plurality of bits; and said output value preparing means comprises said plurality of lookup tables.

14. A gradation converting circuit according to claim 13, wherein said output value selecting means comprises random number generating means for generating random numbers;

said output values selecting means selects a single lookup table out of said plurality of lookup tables based on said random number; and said selected single lookup table outputs said second output value.

15. A gradation converting circuit according to claim 14, wherein said output value adjusting means comprises basic data approximation means for bringing, when a lookup table is selected from said plurality of said lookup tables, an expected value of said second output value outputted from the selected lookup table near to said basic data.

16. A gradation converting circuit according to claim 15, wherein said basic data is represented by a sum of a prescribed first integer value and a prescribed decimal value;

said first value comprises said prescribed first integer value; and said second value comprises a sum of said prescribed first integer value and a prescribed second integer value.

17. A gradation converting circuit according to claim 16, wherein said prescribed second integer value equals 1.

18. A gradation converting circuit according to claim 17, wherein said basic data approximation means selects lookup tables of a first group whose number corresponds to a proportion represented by said prescribed decimal value, out of said plurality of lookup tables and lookup tables of a second group, said second output value from said lookup tables of the first group being a sum of said prescribed first integer value plus 1, and said second output value from said lookup tables of the second group being equal to said prescribed first integer value.

19. A gradation converting circuit according to claim 18, further comprising memory means.

20. A gradation converting circuit according to claim 19, wherein said memory means comprises a ROM, and
said plurality of lookup tables are separately stored in said ROM.

21. A gradation converting circuit according to claim 19, wherein said memory means comprises a RAM, and
said plurality of lookup tables are separately stored in said RAM.

22. A gradation converting circuit according to claim 14 further comprising memory means, wherein said plurality of lookup tables are stored in said memory means, output values of said stored LUTs are accessed by a prescribed address, and said address is defined by said random number generating means and said input data.

23. A gradation converting circuit according to claim 22, wherein
said memory means comprises a ROM, and
said plurality of lookup tables are separately stored in said ROM.

24. A gradation converting circuit according to claim 22, wherein
said memory means comprises a RAM, and
said plurality of lookup tables are separately stored in said RAM.

25. A digital converting circuit, comprising:
storage means for storing therein, corresponding to each of a plurality of input digital values, a plurality digital output values, said digital output values being such that their average is about equal to a desired digital output value associated with each of said input digital values; and
selecting means for randomly selecting, in response to the receipt of any one of said input digital values, one of said digital output values whereby the average digital output values being outputted for each given one of said input digital values is comparatively close to said desired digital value.

26. A converting circuit, comprising:
means for outputting, in correspondence to each of a plurality of input digital values, a corresponding output value; and
means for randomly altering the output value outputted with respect to each of said digital input values such that the average of the output values for any given digital input value is about equal to a desired output value associated with each said digital input values.

27. The converting circuit of claim 26, wherein said outputting means comprises a memory and said memory has stored therein said corresponding output values and, associated with each said corresponding output values, a corresponding decimal value which is indicative of said desired output value; said random altering means comprising means for randomly incrementing each said digital values by 1 based on said corresponding decimal value.

28. The converting circuit of claim 27, wherein said random altering means comprises a comparator and a random number generator, said decimal value being compared to values received from said random number generator and said comparator controlling when said output value is incremented.

* * * * *